Sept. 12, 1950  H. O. REDUE, JR  2,522,299
MILES PER GALLON GAUGE
Filed Feb. 11, 1947  2 Sheets-Sheet 1
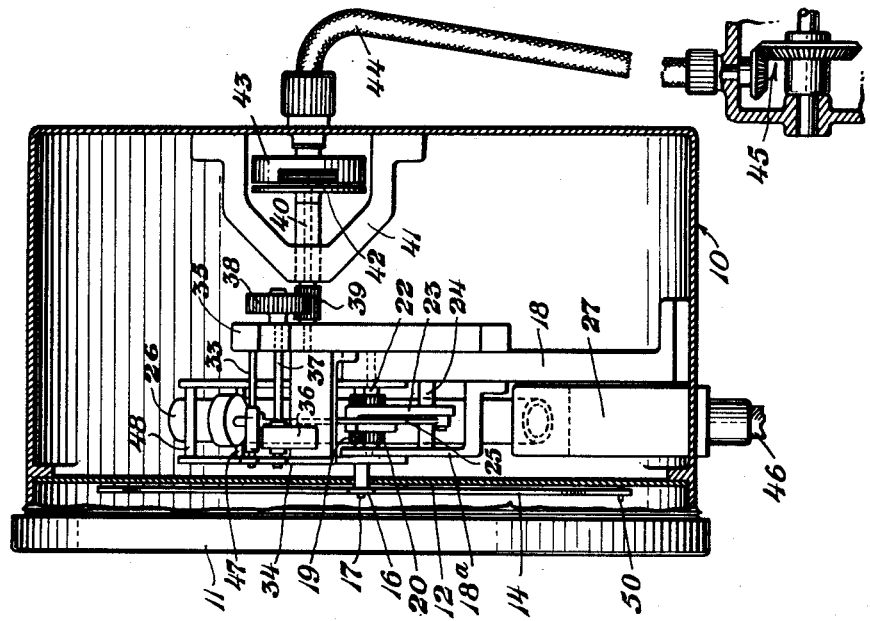
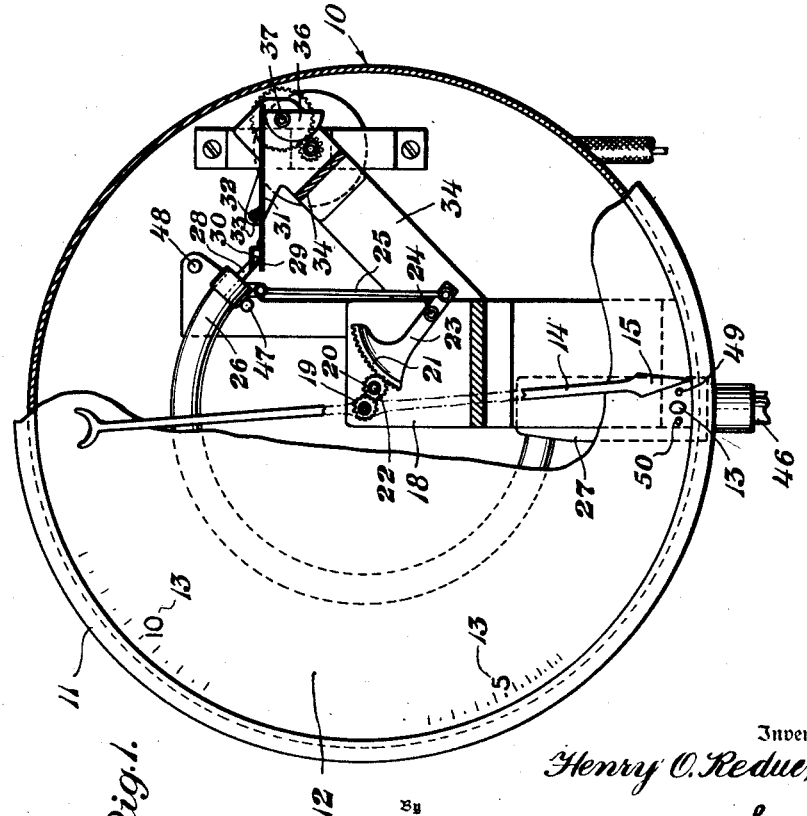
Inventor
Henry O. Redue, Jr
By
Flocks and Simon
Attorneys Sept. 12, 1950  H. O. REDUE, JR  2,522,299
MILES PER GALLON GAUGE
Filed Feb. 11, 1947  2 Sheets-Sheet 2
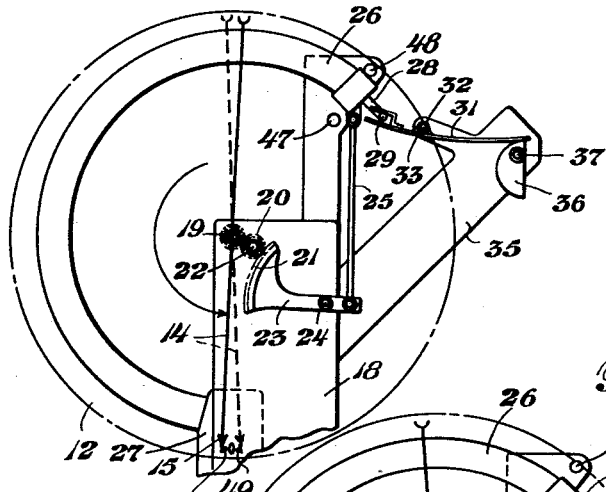
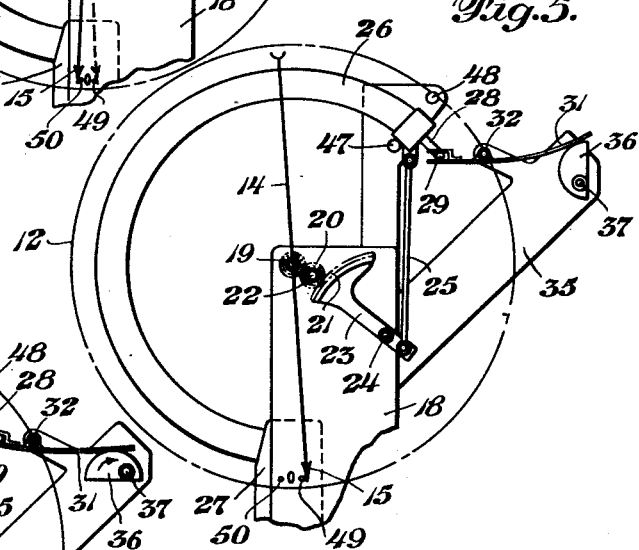
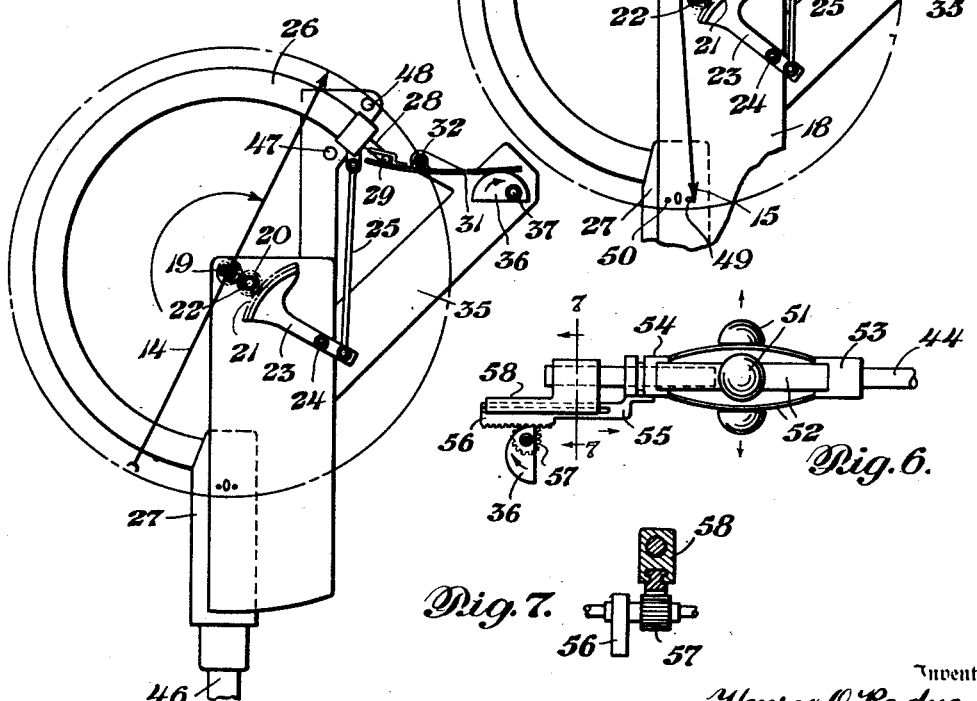
Inventor
Henry O. Redue, Jr.
By Flocks and Simon
Attorneys Patented Sept. 12, 1950

2,522,299

UNITED STATES PATENT OFFICE 2,522,299

MILES PER GALLON GAUGE

Henry O. Redue, Jr., Annapolis, Md.

Application February 11, 1947, Serial No. 727,875

2 Claims. (Cl. 73—114)

1

The present invention relates to an indicating instrument. More particularly the present invention relates to an instrument for registering a variable which is a predetermined function of two other variables as, for example, a registration of the number of miles traveled by a vehicle per gallon of fuel consumed.

Attempts have been made to provide various types of instruments which will correlate the fuel consumption of a vehicle as, for example, a vehicle provided with an internal combustion or Diesel engine, and the distance traveled by the aforesaid vehicle so that the number of miles per gallon of fuel consumed may be read upon a suitable dial or other indicating medium. In general, however, mechanisms of this type have been complicated and have included various types of flow meters which were capable of being adversely affected by the roll or pitch of the vehicle. Further, indicating instruments of this type were not especially suitable for incorporation within the conventional instrument panel of an automotive vehicle or the like.

It is a general object of the present invention therefore to provide a novel indicating instrument which is capable of registering a variable which is a function of two other variables in a positive manner. A second general object of the present invention is to coordinate the action of a pressure responsive means as a Bourdon tube with a suitable indicating means and to correlate the action of the pressure indicating device which responds to the rate of fuel consumption with that of a rate of travel indicating means so that the final indication will measure distance traveled by a power driven vehicle per unit of fuel consumption.

Other objects and the nature and advantages of the instant invention will be apparent from the following description taken in conjunction with the accompanying drawings, wherein:

Figure 1 is a front view, partially broken away, of the indicating instrument in accordance with the present invention.

Figure 2 is a transverse section of the indicating instrument of the present invention.

Figure 3 is a partially diagrammatic view of a portion of the indicating instrument.

Figure 4 is a partially diagrammatic view similar to Figure 3 of the indicating instrument in a different position.

Figure 5 is a view similar to Figures 3 and 4 of the indicating instrument in a third position.

Figure 6 is a detail of a modified form of the invention.

Figure 7 is a section taken on the line 7—7 of Figure 6.

2

Referring to the figures of the drawing and particularly Figure 1, the indicating instrument of the present invention is shown provided with a casing indicated at 10. At the forward end of the casing is a suitable dial structure including the bezel 11 which is adapted to be seated upon a suitable instrument panel (not shown) and is provided with the conventional glass for covering a dial 12 provided with a suitable indicia 13. A pointer 14 is provided having an indicating arrow 15 and a central porton 16 supported for rotation with a shaft 17 having a rearward end journalled in a suitable standard 18 supported by the casing 10. The shaft 17 also carries a pinion 19 which meshes with a second pinion 20 also rotatably supported by the standard 18. A gear sector 21 meshes with the pinion 20 which is rotatable upon a shaft 22. The gear section 21 forms part of an arm 23 which is pivoted on the pivot member 24 carried on the standard 18 at one of its ends and the standard 18a at the other end. The arm 23 pivotally carries at the end remote from the gear sector 21, a link 25. The link 25 at its upper end is fastened to a Bourdon tube 26 which is connected to a fixed pressure chamber 27 at its lower end, the pressure chamber being carried by the casing 10. The interior of the Bourdon tube is open to the chamber 27 and the Bourdon tube is responsive to an increase in pressure within the chamber. In other words, if the pressure in chamber 27 increases, the Bourdon tube tends to straighten and the free end of the Bourdon tube to which the link 25 is attached tends to move in an upward direction as shown in Figure 1.

Also carried by the free end of the Bourdon tube 26 is a hook 28 having a lateral projecting portion 29 slidably fitted within a yoke member 30 which in turn is carried by a spring 31 pivoted at 32 on a shaft 33 journalled at one of its ends in a member 34 and at its other end in a member 35, both supported by the standard 18. The spring 31 bears at the end remote from the yoke 30 on a cam 36 which is pivotally mounted on a shaft 37 also carried by the members 34 and 35. The shaft 37 extends through the member 35 and carries at the end remote from the cam 36 a gear 38 which is rotatable with the shaft. The gear 38 meshes with pinion 39 rotatable with the shaft 40 which is supported for rotation at one of its ends in the member 35 and is supported for rotation in a bracket 41 fixed to the back of the casing 10. The shaft 40 also carries for rotation therewith a disc 42 which is positioned adjacent a permanent magnet 43. The disc 42 is made of a suitable magnetic material and tends to rotate with the magnet 43. The magnet 43 is connected to rotate with a conventional speedometer cable 44 which is connected as by a suitable worm-gear arrangement indicated in general at 45 with a movable portion of a vehicle, such as an automotive vehicle. As may be understood, the disc 42 and the magnet 43 correspond to the conventional mechanism ordinarily utilized for imparting rotation to a magnetic type of speedometer.

At 46 there is indicated a suitable conduit which opens at one of its ends into the pressure chamber 27 and at the other end is preferably connected to the intake manifold of a vehicle engine which serves to drive the vehicle carrying the present device. Inasmuch as the fuel consumption of the vehicle increases, the manifold pressure will increase the movement of the Bourdon tube 26 as influenced by the pressure in the chamber 27 will correspondingly raise the link 25. This will rotate the lever 23 in a counterclockwise direction so as to move the pinion 19 in a counterclockwise direction. This movement will generally be contrary to the movement imparted to the gear 19 through the link 25 by the hook 28 and the yoke 30. In other words, any increase in the speed of the vehicle will tend to rotate the cam 36 in a clockwise direction and lift the end of the spring 31 correspondingly forcing the yoke 30 downwardly so that the link 25 will tend to move in a downward direction and the lever 23 will tend to rotate in a clockwise direction. This will similarly tend to rotate the pointer 14 in a clockwise direction to give a higher reading on the dial 12. If, however, at the same time the pressure in the chamber 27 is rising due to increased fuel consumption the Bourdon tube will tend to move the link 25 in an upward direction and impart a counterclockwise movement to the pointer 14. The net effect of the two forces will therefore impart to the pointer 14 a correlated movement which by proper calibration of the dial 12 will directly read the number of miles traveled per gallon of fuel consumed by the vehicle.

The movable portion of the Bourdon tube 26 cooperates with a pair of fixed stops 47 and 48 which serve to limit the movement of the Bourdon tube between maximum pressure, i. e. minimum suction, and minimum pressure, i. e. maximum suction.

In Figure 1 the Bourdon tube 26 is shown in a position of minimum pressure or maximum suction and the cam 36 is shown in the position which it occupies when the vehicle is at rest. Such a condition exists when the vehicle engine is running but is utilizing a minimum amount of fuel as when idling. At this time the Bourdon tube 26 is in a contracted position and the link 25 is in the lowermost position so that the lever 23 has revolved to an extreme clockwise position. At this time the pointer 14 is against the stop 49. Before the vehicle has been started and when there is a condition of minimum suction or zero pressure, the Bourdon tube 26 will occupy the position shown in Figure 3, i. e. the Bourdon tube will be against the stop 48 and the pointer 14 which is shown diagrammatically in Figure 3 will be against the stop 50 which is clockwise of the zero indication.

In Figure 4 a condition is shown when the vehicle is moving along the road at a fair rate of speed and the fuel consumption is also relatively low. At this time the intake pressure will be such that the Bourdon tube 26 occupies a position midway between the stops 47 and 48 and the cam 36 has also revolved sufficiently to move the cam end of the spring 31 upwardly. The link 25 will then be part-way down and the gear sector 21 on the lever 23 will be in an intermediate position so that the pointer 14 will indicate as for example, approximately 15 miles per gallon of gas or some other suitable figure.

In Figure 5 there is shown another position of the device which would exist when the speed of the vehicle was at a maximum and the intake pressure and fuel consumption was at a minimum or a condition of maximum suction. Such a condition would exist if the vehicle was proceeding down a hill at a relatively high rate of speed. It will be noted that here again the Bourdon tube 26 is against the stop 47 and the pointer 14 is against the stop 49, thus indicating a maximum number of miles per gallon.

Obviously, under various conditions of fuel consumption and fuel speed, the pointer 14 may assume any position around the dial and when properly calibrated will furnish an accurate indication of the rate of the fuel consumption per unit of distance traveled. Although the conduit 46 has been stated to be preferably connected to the intake manifold so that the Bourdon tube 26 operates at pressures varying from a maximum suction pressure to zero pressure, it is within the general scope of the present invention to connect the conduit 46 to the fuel line between the fuel pump and carburetor so that positive pressures will be indicated which will increase with the amount of fuel consumed. The operation of the device, however, will be substantially the same.

In Figure 6 a modified form of mechanism is shown for transmitting rotation to the cam 36 in accordance with changes in vehicle speed. As here shown, a number of fly balls indicated at 51 are used which are mounted upon springs 52. A fixed collar 53 is mounted upon the cable 44 for rotation therewith. The end of the springs 52 remote from the collar 53 is connected to a sliding collar 54 so that as the speed of the cable 44 increases the fly balls 51 will move outwardly and move the collar 54 to the right. Connected to the collar 54 is a leg 55 provided with a tail 56 meshing with pinion 57 which is mounted for rotation with the cam 36. The leg 55 is guided in its sliding movement by a guide member 58. Increasing speeds therefore of the vehicle will move the leg 55 to the right as shown in Figure 6 and correspondingly move the cam 36 in a clockwise direction.

It will be obvious to those skilled in the art that various changes may be made without departing from the spirit of the invention and therefore the invention is not limited to what is shown in the drawings and described in the specification but only as indicated in the appended claims.

I claim:

1. In a meter for correlating the rate of fuel flow and the rate of travel of a vehicle, an indicating means, means to actuate said indicating means including a Bourdon tube fixed at one end and movable at the other end in response to the rate of fuel flow, and means for modifying the movement of the movable end of the Bourdon tube including a spring means pivoted at a point intermediate of its two ends and a cam responsive to the speed of the vehicle, one of the said ends of the pivoted spring means being attached to the movable end of the Bourdon tube and the other of said ends in contact with the said cam means so that variations in the speed of the vehicle will modify the movement of the movable end of the Bourdon tube, the said movable end of the Bourdon tube moving in one direction in response to the rate of fuel flow and moving in the opposite direction by the said movement modifying means whereby the ratio of the two variables is continuously indicated by said indicating means.

2. In a meter in accordance with claim 1 including a speedometer cable, a gear and a shaft, said shaft being attached to the said cam and the said gear and rotatable therewith, said gear being rotated in accordance with the speed of rotation of said speedometer cable.

HENRY O. REDUE, Jr.

REFERENCES CITED

The following references are of record in the file of this patent:

UNITED STATES PATENTS

| Number | Name | Date |
|---|---|---|
| 1,032,384 | Dixon | July 16, 1912 |
| 1,444,098 | Berry | Feb. 6, 1923 |
| 1,477,489 | Hough | Dec. 11, 1923 |
| 2,031,192 | Sutherland et al. | Feb. 18, 1936 |
| 2,268,549 | Kennedy | Jan. 6, 1942 |
| 2,333,793 | Johnson | Nov. 9, 1943 |
| 2,422,240 | Jackes | June 17, 1947 |